United States Patent
Browning

(10) Patent No.: US 8,499,720 B2
(45) Date of Patent: Aug. 6, 2013

(54) HEAT RESISTANT SYSTEM FOR OUTDOOR ANIMAL HOUSING AND NESTING

(76) Inventor: Mark Browning, Pittsburgh, PA (US)

(*) Notice: Subject to any disclaimer, the term of this patent is extended or adjusted under 35 U.S.C. 154(b) by 0 days.

(21) Appl. No.: 12/874,157

(22) Filed: Sep. 1, 2010

(65) Prior Publication Data

US 2012/0048204 A1  Mar. 1, 2012

(51) Int. Cl.
*A01K 31/14* (2006.01)

(52) U.S. Cl.
USPC .......................... 119/435; 119/329

(58) Field of Classification Search
USPC ............... 119/435, 428, 429, 430, 432, 433, 119/434, 329, 482, 490, 487, 493, 500
See application file for complete search history.

(56) References Cited

U.S. PATENT DOCUMENTS

| | | | | |
|---|---|---|---|---|
| 1,618,404 A * | 2/1927 | Berry | | 119/482 |
| 3,566,842 A * | 3/1971 | Oldaker | | 119/430 |
| 3,643,631 A * | 2/1972 | Wade et al. | | 119/434 |
| 5,186,123 A * | 2/1993 | Cuddy | | 119/434 |
| 5,493,997 A * | 2/1996 | Ritchey | | 119/428 |
| 6,234,116 B1 * | 5/2001 | Havener | | 119/482 |
| 7,322,314 B1 * | 1/2008 | Sweeney | | 119/483 |
| 2004/0079295 A1 * | 4/2004 | Sims | | 119/329 |

* cited by examiner

*Primary Examiner* — Yvonne Abbott
(74) *Attorney, Agent, or Firm* — Theodore J. Bielen, Jr.

(57) ABSTRACT

An apparatus for a nest box includes an outer box for establishing a nesting enclosure. The outer box is molded from a plastic material impregnated with a heat-reflective pigment. The outer box includes a generally rectangular shape with an open end, a closed end, sides, a top and a bottom. The sides have a plurality of vent holes. The bottom has a plurality of drain holes. The top has vent slots. An inner liner is contained within the outer box with an air space between the inner liner and the outer box. The inner liner includes an open end, a closed end, sides and a bottom. The sides have a plurality of vent holes. The top has a plurality of vent holes. The bottom has a plurality of drain holes. A radiant barrier foil is joined to an interior surface of the outer box. A faceplate covers the open end.

5 Claims, 5 Drawing Sheets

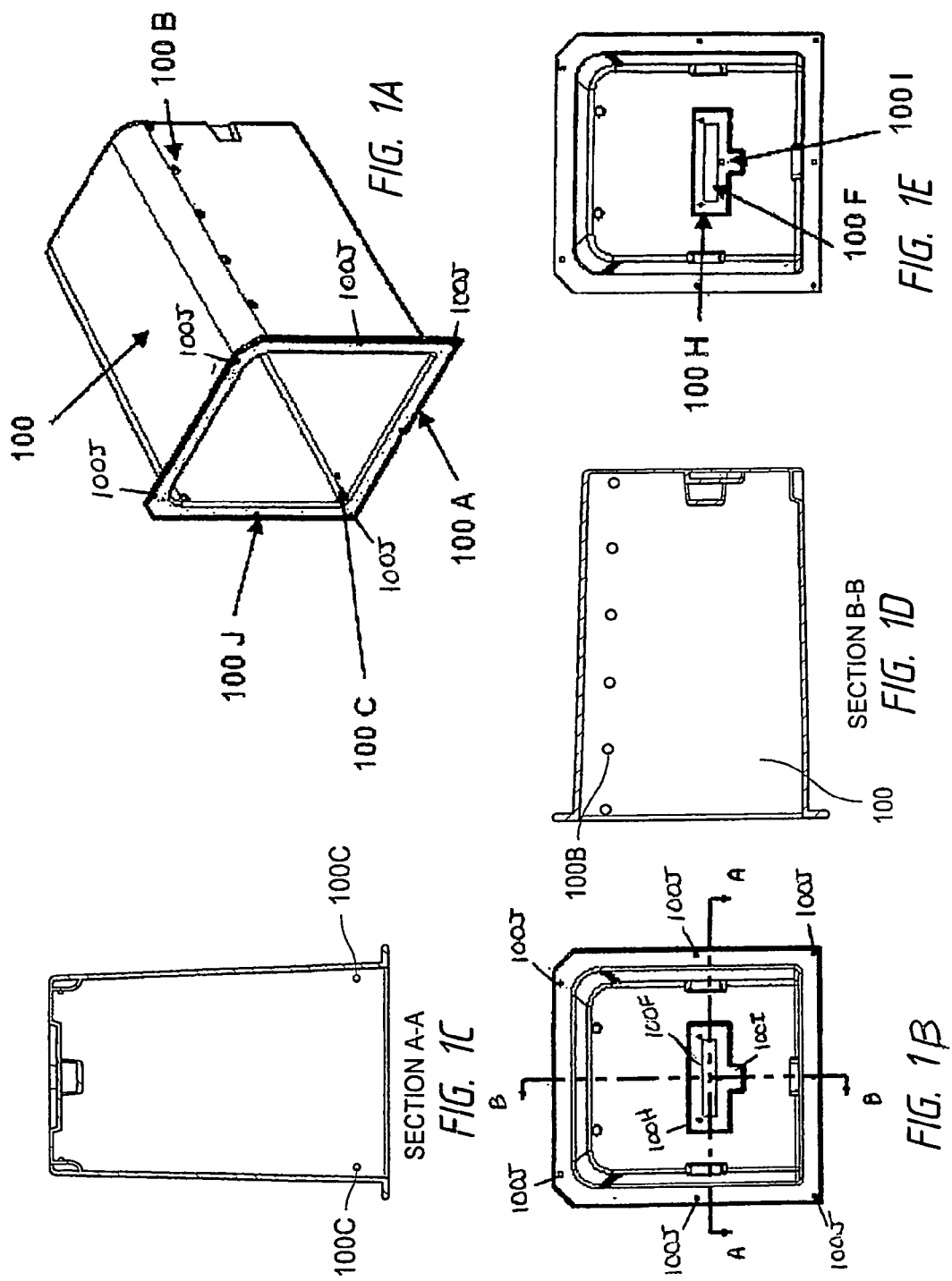

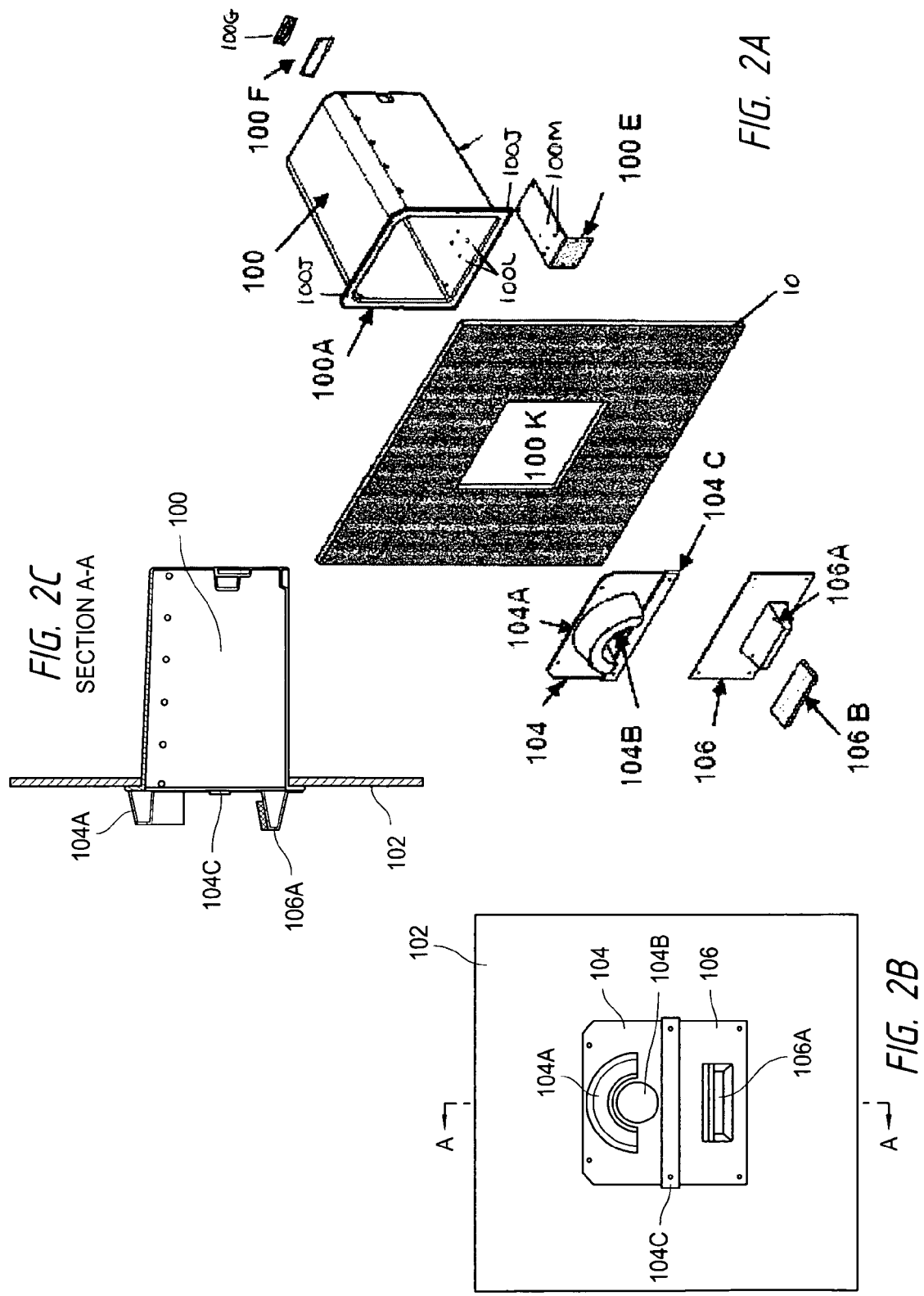

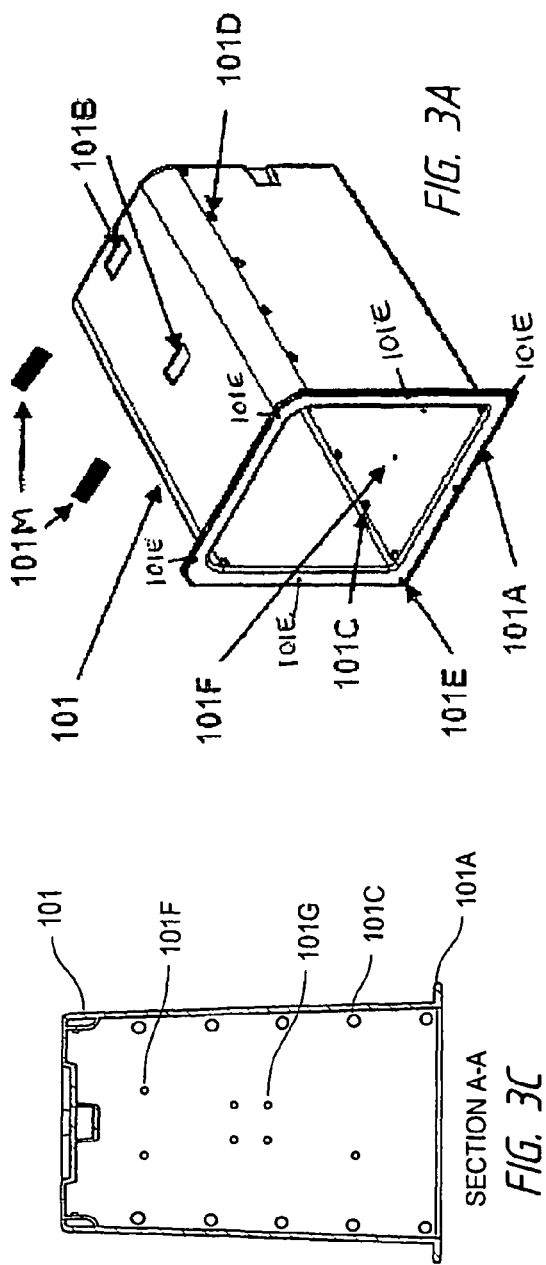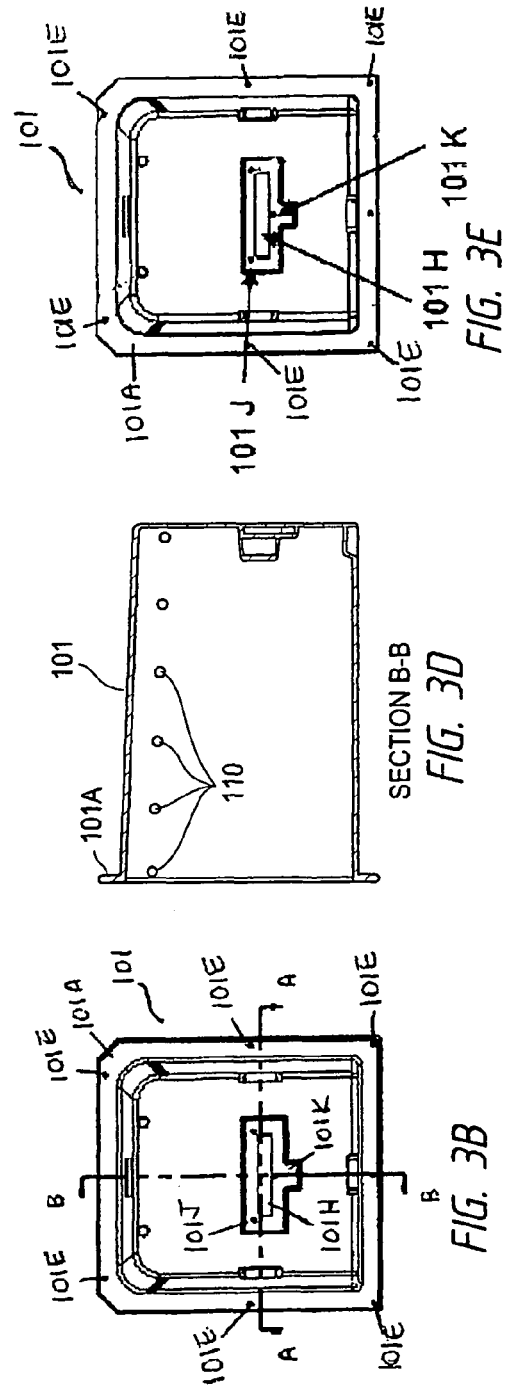

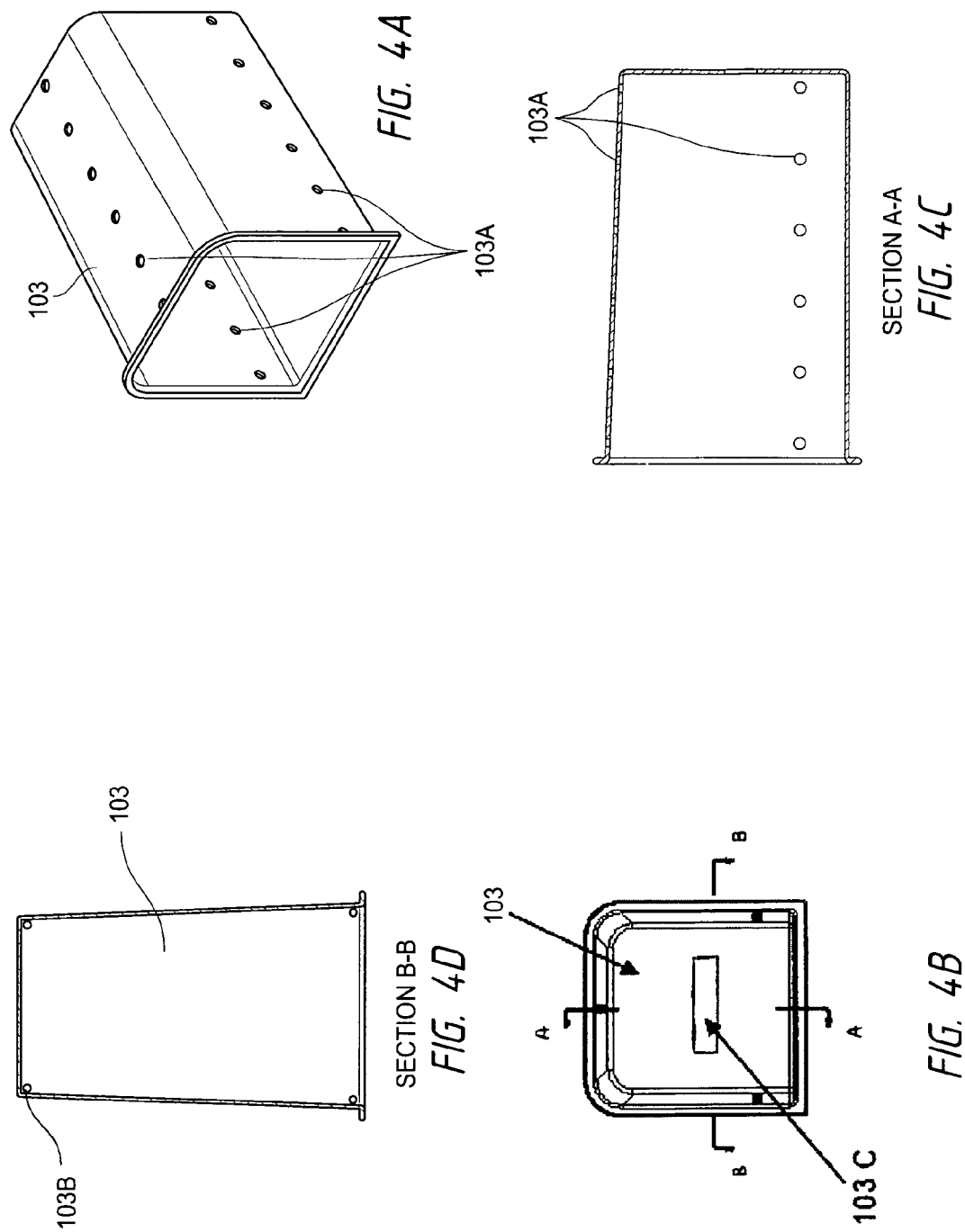

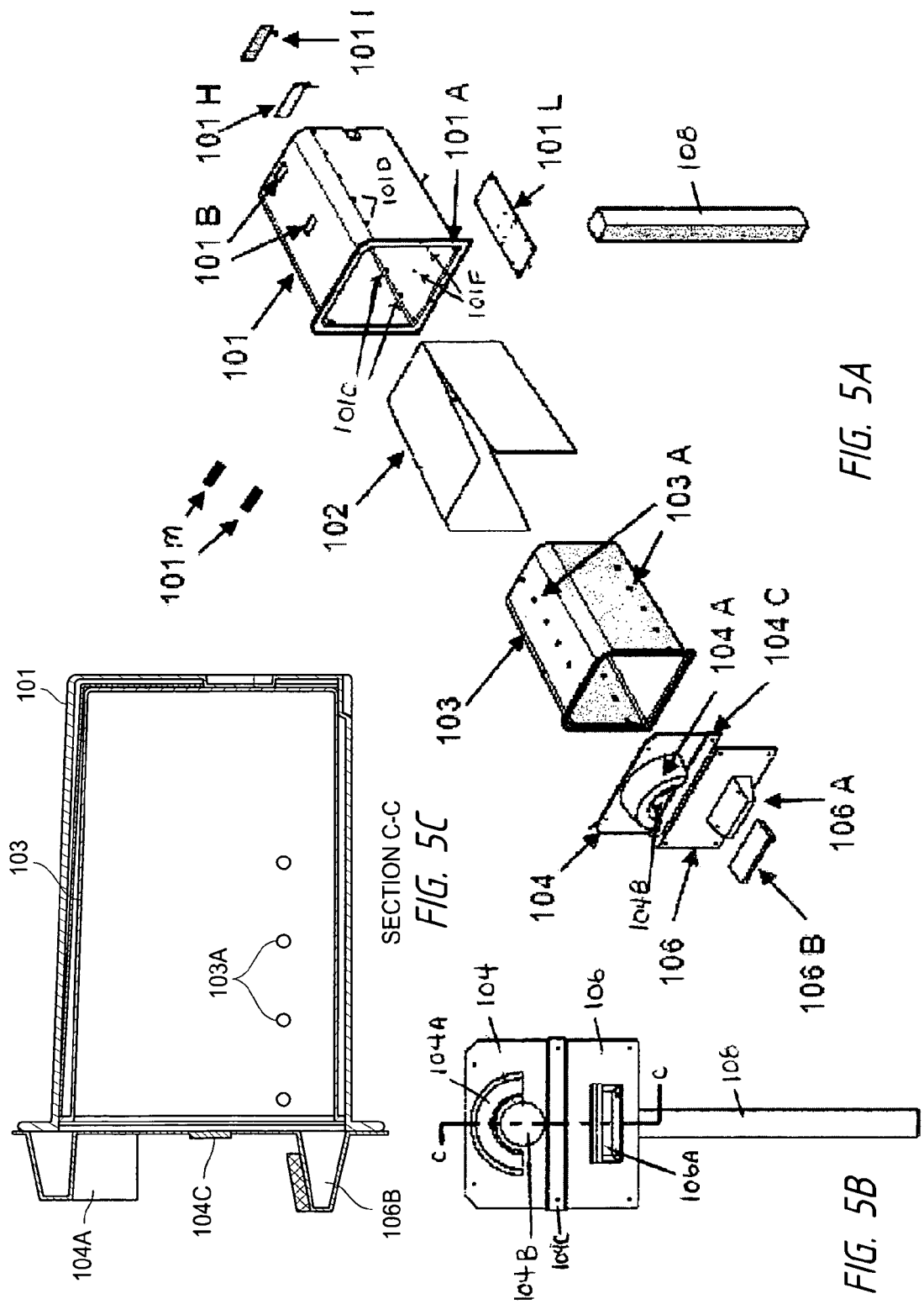

HEAT RESISTANT SYSTEM FOR OUTDOOR ANIMAL HOUSING AND NESTING

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to pest control. More particularly, the invention relates to a plastic barn owl box that may be installed in existing buildings or posts and resists heat absorption.

BACKGROUND OF THE INVENTION

The barn owl is the widest-spread land bird in the world, inhabiting all continents except Antarctica. Due to its historic habit of nesting in manmade buildings and its appetite for destructive rodents, the barn owl has long been a valued frequenter of farms. A single family of barn owls can consume over three thousand rodents annually. In recent years, with increasing emphasis being placed on Integrated Pest Management (IPM), the large broods and voracious appetite of the barn owl have made it a favorite species for utilization in rodent control programs around the world. These rodent control programs are used in various different agricultural applications including, without limitation, sugar cane, dairy, crop, and fruit enterprises.

Unfortunately, the population of the barn owl has declined in many areas of the world, including, but not limited to, areas in the United States. One reason for this decline is a lack of nesting sites. The erection of nest boxes by conservation organizations and concerned individuals is a vital part of bringing the barn owl back to areas that it once frequented.

Individuals and businesses however cannot avail themselves of a mass-produced barn owl nest boxes since there are none on the market. Furthermore, there is no prior art relating to a nest box for barn owls. Several enterprises however do offer wooden nest boxes for sale, mostly on the Internet. Other people and businesses interested in putting up barn owl nest boxes build their own, often according to plans published on the Internet and in magazines. These wooden boxes are heavy, expensive to ship, difficult to install and, being made of wood, do not last long in the field. Many enterprises report that their wooden barn owl boxes last about two years, therefore compounding the expense in utilizing wood.

There are two main methods for mounting barn owl nest boxes. Nest boxes may be mounted in existing buildings or on posts in open fields. However, installing the nest boxes inside barns or other buildings gives the owls access to the interior of the buildings. Biologists have cautioned against this due to the presence of salmonella and other pathogens in barn owl feces. Also, new prefabricated metal barns present their own problems. For one, as these barns have replaced old, airy, wooden barns and have taken away traditional nesting sites for barn owls, mainly, there are no cracks or holes for the birds to enter. Therefore, these metal barns have contributed to the barn owl's decline. Second, no barn owl nest box on the market is designed to fit into the barn in such a way as to afford the barn owls a nesting site but deny the owls and pest species access to the interior of the barn. Pole mounted boxes are usually placed in open fields in full sun, and this presents the problem of overheating, particularly in sub-tropical and tropical climates.

The problems created by the use of wood, including, heaviness, expense of shipping, difficulty of installation, need for frequent replacement, overheating in sun, and lack of adaptation to modern metal barns, have most likely limited the willingness of farmers to utilize barn owls in their IPM schemes despite the good results reported by those who have been using barn owls for such programs. In turn, this has limited the potential benefits of IPM, namely a decreased use of rodent poisons, less poison in the food chain and the environment, decreased costs to the farmer, and higher profits. Many of the above-mentioned problems inherent to using wood can be overcome by using plastic. However plastic presents its own problem, namely that the absorption of heat of plastic is even greater than that of wood.

In view of the foregoing, there is a need for improved techniques for providing a barn owl nest box that is lightweight, weather resistant, less prone to overheating, and easy to install in buildings and on poles.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B, 1C, 1D, and 1E illustrate an exemplary barn owl box that may be mounted in a barn or other type of building, in accordance with an embodiment of the present invention. FIG. 1A is a side perspective view. FIG. 1B is a front view. FIG. 1C is a cross sectional view of section A-A, indicated on FIG. 1B. FIG. 1D is a cross sectional view of section B-B, indicated on FIG. 1B, and FIG. 1E is a back view;

FIGS. 2A, 2B and 2C illustrate an exemplary barn owl box installed on a wall, in accordance with an embodiment of the present invention. FIG. 2A is an exploded view. FIG. 2B is a font view, and FIG. 2C is a cross sectional view of section A-A as indicated in FIG. 2B;

FIGS. 3A, 3B, 3C, 3D, and 3E illustrate an exemplary barn owl box that may be mounted on a post, in accordance with an embodiment of the present invention. FIG. 3A is a side perspective view. FIG. 3B is a front view. FIG. 3C is a cross sectional view of section A-A as indicated on FIG. 3B. FIG. 3D is a cross sectional view of section B-B as indicated on FIG. 3B, and FIG. 3E is a back view;

FIGS. 4A, 4B, 4C, and 4D illustrate an exemplary liner for a barn owl box, in accordance with an embodiment of the present invention. FIG. 4A is a side perspective view. FIG. 4B is a front view. FIG. 4C is a cross sectional view of section A-A as indicated on FIG. 4B, and FIG. 4D is a cross sectional view of section B-B as indicated on FIG. 4B; and FIGS. 5A, 5B and 5C illustrate an exemplary barn owl box installed on a post, in accordance with an embodiment of the present invention. FIG. 5A is an exploded view. FIG. 5B is a font view, and FIG. 5C is a cross sectional view of section B-B as indicated in FIG. 5B.

Unless otherwise indicated illustrations in the figures are not necessarily drawn to scale.

SUMMARY OF THE INVENTION

To achieve the forgoing and other objects and in accordance with the purpose of the invention, a nest box system for pest control is presented.

In one embodiment an apparatus for a nest box is presented. The apparatus includes means for enclosing a nesting space with an open end, a plurality of vent holes and a plurality of drain holes and means for covering the open end and providing access to the enclosing means. Another embodiment further includes means for joining the apparatus to a structure. Yet another embodiment further includes means for reflecting heat from the enclosing means. Still another embodiment further includes means for containment within the enclosing means with an air space between the containment means and the enclosing means. Another embodiment further includes means for establishing a radiant barrier between the enclosing means and the containment means.

In another an apparatus for a nest box is presented. The apparatus includes an outer box for establishing a nesting enclosure. The outer box is molded from a plastic material and includes a generally rectangular shape with an open end, a closed end, sides, a top and a bottom. The sides includes a plurality of vent holes positioned in upper portions. The bottom includes a plurality of drain holes. A faceplate covers the open end. The faceplate includes an opening for providing access to the outer box. Another embodiment further includes a bracket for joining the apparatus to a structure. In other embodiments the plastic material is impregnated with a heat-reflective pigment and the heat-reflective pigment includes titanium dioxide. In yet another embodiment the faceplate further includes a rain-guard positioned above the opening and a landing edge below the opening. Another embodiment further includes an inner liner having a generally rectangular shape for containment within the outer box with an air space between the inner liner and the outer box. The inner liner further includes an open end, a closed end, sides, a top and a bottom. The sides have a plurality of vent holes positioned in lower portions. The top has a plurality of vent holes. The bottom has a plurality of drain holes. Yet another embodiment further includes a radiant barrier foil joined to an interior surface of the outer box. In another embodiment the top of the outer box further includes vent slots and vent covers. In yet another embodiment the outer box and the inner liner further include windows for viewing the interior. In still another embodiment the structure is an exterior wall of a building having an opening for accessing the outer box.

In another embodiment an apparatus for a nest box is presented. The apparatus includes an outer box for establishing a nesting enclosure. The outer box is molded from a plastic material wherein the plastic material is impregnated with a heat-reflective pigment. The outer box includes a generally rectangular shape with an open end, a closed end, sides, a top and a bottom. The sides have a plurality of vent holes positioned in upper portions. The bottom has a plurality of drain holes. The top has vent slots and vent covers. An inner liner includes a generally rectangular shape for containment within the outer box with an air space between the inner liner and the outer box. The inner liner further includes an open end, a closed end, sides and a bottom. The sides have a plurality of vent holes positioned in lower portions. The top has a plurality of vent holes. The bottom has a plurality of drain holes. A radiant barrier foil is joined to an interior surface of the outer box. A faceplate covers the open end. The faceplate includes an opening for providing access to the outer box. Another embodiment further includes a bracket for joining the apparatus to a structure. In another embodiment the heat-reflective pigment includes titanium dioxide. In yet another embodiment the faceplate further includes a rain-guard positioned above the opening and a landing edge below the opening. In still another embodiment the structure is an exterior wall of a building having an opening for accessing the outer box.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

In a preferred embodiment of the present invention, a barn owl box is constructed of molded polyethylene plastic 7/32 of an inch thick. The barn owl box in this embodiment measures 17 inches high by 17 inches wide and 26 inches long. A front piece or faceplate is attached to the box with six small bolts and features an entrance hole, a landing ledge and a rounded rain-guard. This faceplate comprises two pieces, an upper half comprising the entrance hole, the rain-guard and a raised shiplap along the lower edge of the upper half, and a lower half comprises the landing ledge and fits up into the shiplap on the upper half. Two bolts eventually hold the upper and lower halves tightly together to a plastic flange on the box. Those skilled in the art, in light of the present teachings will readily recognize that a multiplicity of suitable sizes and shapes are suitable for various embodiments of the present invention. Preferred embodiments of the present invention may be implemented to be mounted in a barn or other type of building or may be mounted on a post. .

FIGS. 1A, 1B, 1C, 1D, and 1E illustrate an exemplary barn owl box 100 that may be mounted in a barn or other type of building, in accordance with an embodiment of the present invention. FIG. 1A is a side perspective view. FIG. 1B is a front view. FIG. 1C is a cross sectional view of section A-A, indicated on FIG. 1B. FIG. 1D is a cross sectional view of section B-B, indicated on FIG. 1B, and FIG. 1E is a back view. In the present embodiment, box 100 is generally rectangular in shape and has a flange 100A at the open end. Box 100 comprises a row of equidistant vent holes 100B that are ¾ of an inch in diameter along the upper sides of box 100. In alternate embodiments these vent holes may vary in size. Vent holes 100B provide the necessary fresh air for a growing brood of birds. Box 100 also comprises four drain holes 100C in each corner of the floor of box 100, generally ensuring that box 100 remains dry. In the present embodiment drain holes 100C are ½-inch in diameter; however, drain holes may vary in size, shape, number and location in alternate embodiments. In the present embodiment, box 100 is constructed of molded polyethylene plastic that is tinted dark tan to block light and generally maintain a dark interior for the birds. Alternate embodiments may be constructed of various other materials such as, but not limited to, and may be tinted various different opaque colors. Box 100 also comprises six screw holes 100J for mounting box 100. Alternate embodiments may comprise various numbers of screw holes for mounting the box.

Referring to FIGS. 1B and 1E, in the present embodiment, box 100 comprises a viewing window 100F that enables a user to look into box 100. Users may wish to look into box 100 for various reasons including, but not limited to, determining if any owls are nesting inside and determining if box 100 requires cleaning or maintenance. In the present embodiment, viewing window 100F is a piece of clear plastic that is attached to box 100 with fasteners 100H to cover a hole in box 100. Fasteners 100H may be various different types of fastening means including, but not limited to, screws or bolts, and in some embodiments the viewing window may be attached to the box using adhesives. Element number 100H illustrates the upper two fasteners that fasten the rubber shade and acrylic window to the nest box. 100H differs from 100I in that the fasteners go through both the rubber shade and acrylic window. In the present embodiment, viewing window 100F is rectangular in shape; however, viewing windows may be various different shapes in alternate embodiments. Element number 100I illustrates the lower fastener that goes only through the acrylic window and not through the rubber shade, making it possible to lift the rubber shade to view the interior of the nest box. Some embodiments may comprise a viewing window cover 100G that blocks the light into viewing window 100F when not in use, for example, without limitation, viewing window cover 100G shown by way of example in FIG. 2A.

FIGS. 2A, 2B and 2C illustrate an exemplary barn owl box 100 installed on a wall 107, in accordance with an embodiment of the present invention. FIG. 2A is an exploded view. FIG. 2B is a font view, and FIG. 2C is a cross sectional view of section A-A as indicated in FIG. 2B. In typical application of the present embodiment to its environment, box 100 is designed to fit within the walls of either metal or wooden barns at a height of 8' or higher. There are different methods for installing box 100 into wall 107. One exemplary method is to cut a square hole 100K in the side of the barn in wall 107 into which box 100 can fit. In the present embodiment hole 100 is 17 inches by 17 inches; however, the hole may be various different sizes depending on the size of the box being installed. If this is a metal barn with reinforcing ridges, as opposed to a flat wooden or metal surface, along the top and bottom edges of hole 100K are taped two lengths of self-adhesive, weatherproof, expanding rubber gasket. As it slowly expands, the gasket fills in any gaps created by the ridges and thus seals the opening from pest species and moisture. Box 100 slides into hole 100K in wall 107 of the barn from the outside, and a flange 100A of box 100 presses snugly against wall 107 or the gasket, if a gasket is used. Then four screws are driven through screw holes 100J in flange 100A into wall 107. Then an upper faceplate piece 104 and a lower faceplate piece 106 are fastened to box 100 with screws that are driven through faceplate pieces 104 and 106, screw holes 100J in flange 100A, and wall 107. Upper faceplate piece 104 comprises a rain guard 104A, an entrance hole 104B and a raised shiplap 104C. Lower faceplate piece 106 comprises a landing ledge 106A and fits up into shiplap 104C on upper faceplate piece 104. Element number 106B illustrates the composite wooden perch that gets fastened to the landing ledge. This perch allows resident birds to land and perch more easily. Alternate embodiments may comprise a faceplate that is a single piece rather than two pieces.

Referring to FIG. 2A, on the interior of wall 107 of the barn, box 100 is supported with a galvanized metal support bracket 100E to which box 100 is bolted with bolts through screw holes 100L in the floor of box 100. Flat push-nuts, pushed onto the threads that protrude through the bottom of the floor, hold the bolts in place while box 100 is maneuvered so the bolts in the floor of box 100 line up with predrilled holes 100M in galvanized support bracket 100E. Then washers and nuts secure box 100 in place. This method, although more work in the beginning and more invasive to the barn than the following method, Facilitates cleaning of box 100 since the faceplate is easily removed by removing six screws and the wide opening affords ample access. A transparent viewing window 100F on the back of box 100 enables a user to look into box 100 to determine when a cleaning is needed. Viewing window 100F can be covered by viewing window cover 100G when not in use to generally prevent light from entering box 100 through viewing window 100F. In the present embodiment, viewing window cover 100G is constructed of rubber and attaches to box 100 with fasteners such as, but not limited to, screws or bolts. Alternate embodiments may comprise no viewing window cover or viewing window covers with varying designs. For example, without limitation, in one alternate embodiment, the viewing window cover may be attached to the box with a hinge above the viewing window that enables a user to life the viewing window cover to look into the box without removing the viewing window cover.

Another exemplary method for installing box 100, which is less invasive to the barn, is to cut an 8-inch square in the barn wall and line up the hole in the front of box 100 with the hole in the barn. Box 100 is then attached to the interior of the barn wall with flange 100A against the interior of the barn by dropping two carriage head bolts down through the floor of box 100. Flat push-nuts hold the bolts in place while the box is maneuvered so the bolts in the floor of the box line up with predrilled holes a galvanized support bracket, similar to support bracket 100E shown by way of example in FIG. 2A. Then washers and nuts secure box 100 in place. On the exterior, a self-adhesive expanding rubber gasket is taped above and below the hole in the barn. Then the faceplate of box 100 is attached to the barn by driving screws through the faceplate, the barn wall, and into flange 100A around box 100 on the interior. Though requiring less work in the beginning and less invasive to the barn than the installation previously described, this method makes cleaning box 100 more difficult since box 100 must be removed from the interior of the barn and lowered to the floor for cleaning With either installation method, box 100 provides barn owls access to box 100 through entrance hole 104B where the owls can breed successfully while the owls and pest species are denied access to the barn.

FIGS. 3A, 3B, 3C, 3D, and 3E illustrate an exemplary barn owl box 101 that may be mounted on a post, in accordance with an embodiment of the present invention. FIG. 3A is a side perspective view. FIG. 3B is a front view. FIG. 3C is a cross sectional view of section A-A as indicated on FIG. 3B. FIG. 3D is a cross sectional view of section B-B as indicated on FIG. 3B, and FIG. 3E is a back view. The present embodiment is built upon the same basic molded design described and illustrated by way of example in reference to FIGS. 1A through 2C; however, due to the typical application in open fields in full sun, the present embodiment must solve the inherent problem of solar radiant-heat absorption by polyethylene. Therefore, the present embodiment incorporates a number of technologies already utilized in other fields in order to keep the interior of box 101 close to ambient temperatures on days of high sunlight and heat.

Referring to FIGS. 3A through 3E, in the present embodiment, box 101 comprises a flange 101A onto which faceplate pieces may be attached, for example without limitation, upper faceplate piece 104 and lower faceplate piece 106 shown by way of example in FIGS. 2A and 5A. Screw holes 101E enable the faceplate pieces to be attached to flange 101A. Box 101 also comprises vent holes 101C along the floor of box 101, vent holes 101D along the upper sides of box 101, vent slots 101B in the top of box 101, and vent covers 101M over vent slots 101B. In the present embodiment vent holes 101C and 101D are ¾ of an inch in diameter; however, alternate embodiments may comprise venting means of various shapes and sizes. In the present embodiment, screw holes 101F and 101G in the floor of box 101 enable box 101 to be mounted to a mounting bracket and post, for example, without limitation, post 108 shown by way of example in FIGS. 5A and 5B.

Referring to FIGS. 3B and 3E, in the present embodiment, box 101 comprises a viewing window 101H that enables a user to look into box 101. Users may wish to look into box 101 for various reasons including, but not limited to, determining if any owls are nesting inside and determining if box 101 requires cleaning or maintenance. In the present embodiment, viewing window 101H is a piece of clear plastic that is attached to box 101 with fasteners 101J to cover a hole in box 101. Fasteners 101J may be various different types of fastening means including, but not limited to, screws or bolts, and in some embodiments the viewing window may be attached to the box using adhesives. Element number 101J illustrates the upper two fasteners that fasten the rubber shade and acrylic window to the nest box. 101J differs from 100K in that the fasteners go through both the rubber shade and acrylic window. In the present embodiment, viewing window 101H is rectangular in shape; however, viewing windows may be various different shapes in alternate embodiments. Element number 101K illustrates the lower fastener that goes only through the acrylic window and not through the rubber shade, making it possible to lift the rubber shade to view the interior of the nest box. Some embodiments may comprise a viewing window cover that blocks light into box 101 through viewing window 101H when not in use, for example, without limitation, viewing window cover 101I shown by way of example in FIG. 5A.

Referring to FIGS. 3A through 3E, the plastic of box 101 in the present embodiment is constructed of polyethylene that is impregnated in the compounding stage with a specially engineered, heat-reflective pigment. In the present embodiment this pigment is TiO2 R-105, made by DuPont, which is a form of titanium dioxide. This bright white pigment is now being used in roofing in hot climates. In field tests on a prototype, polyethylene impregnated with TiO2 remained 18 degrees Fahrenheit cooler in full sun at 85 degrees Fahrenheit than white polyethylene that did not contain TiO2. Those skilled in the art, in light of the present teachings, will recognize that various other pigments or additives are available to enhance the heat-reflecting properties of the polyethylene such as, but not limited to, Some embodiments may not include additives or special pigments for increasing heat-reflecting properties depending on the final application of the embodiment; for example, without limitation, boxes that will be used in mild climates or positioned in shady or wooded areas may not require increased heat-reflecting properties. Furthermore, alternate embodiments may be constructed of material other than polyethylene such as, but not limited to, FIGS. 4A, 4B, 4C, and 4D illustrate an exemplary liner 103 for a barn owl box, in accordance with an embodiment of the present invention. FIG. 4A is a side perspective view. FIG. 4B is a front view. FIG. 4C is a cross sectional view of section A-A as indicated on FIG. 4B, and FIG. 4D is a cross sectional view of section B-B as indicated on FIG. 4B. In the present embodiment, liner 103 comprises vent holes 103A along the sides and top of liner 103 and drainage holes 103B in the floor of liner 103. In the present embodiment, vent holes 103 are equidistant ¾-inch holes along the lower edges of the sides of liner 103 and down the middle of the roof of liner 103. However, in alternate embodiments, the liner may comprise venting means of various different sizes and shapes and in various different locations. In the present embodiment, liner 103 also comprises a viewing hole 103C that lines up with viewing window 101H on box 101, shown by way of example in FIG. 3E. In the present embodiment, liner 103 is molded of black or dark brown plastic to block light since the birds prefer the dark. However, in alternate embodiments the liner may be constructed of various different materials in various different colors.

FIGS. 5A, 5B and 5C illustrate an exemplary barn owl box 101 installed on a post 108, in accordance with an embodiment of the present invention. FIG. 5A is an exploded view. FIG. 5B is a font view, and FIG. 5C is a cross sectional view of section B-B as indicated in FIG. 5B. In the present embodiment, a liner 103 is slightly smaller than box 101 and slides inside box 101 leaving a ½-inch gap of air between the walls, ceilings, and floors of box 101 and liner 103. In alternate embodiments, the space between the liner and the box may be larger or smaller. In the present embodiment, this gap provides space for the interior walls and ceiling of box 101 to be lined with a radiant barrier foil 102, which is a tough aluminum foil that dissipates heat very efficiently. This material is typically used as radiant barrier insulation in the attics of buildings. Foil 102 is taped to the interior of box 101 with a high-strength adhesive tape with care taken not to block any of vent holes 101C and 101D. Alternate embodiments may not include a foil barrier between the box and the liner.

In the present embodiment, along the floor of box 101 are vent holes 101C that draw air up into the space between liner 103 and box 101. Vent holes 101D at the top of box 101 and weatherproof vent covers 101M mounted over vent slots 101B in the ceiling of box 101 create a flue-like effect. Cooler, shaded air enters box 101 through vent holes 101C in the floor, flows into the airspace between foil 102 and liner 103, rises along the walls, and then exits through vent holes 101D in the sides of box 101 and vent slots 102 in the top of box 101. Furthermore, liner 103 comprises vent holes 103A to generally ensure adequate airflow for the birds, The result of the various cooling aspects in the present embodiment including the titanium oxide in the plastic of box 101, radiant barrier foil 102, the double box system, and ample venting, is a barn owl nesting site that remains close to ambient temperatures in full sun. A utility of providing a cool nesting site is that barn owls, being nocturnal, remain in nest box 101 during the day, and the young are exceptionally prone to overheating and dehydration. It should be appreciated that the present embodiment utilizing the double-box system, radiant barrier foil, titanium dioxide-impregnated plastic, and efficient venting is not limited to use as a barn owl housing, but also can be applied to any animal enclosure used in full sun, including but not limited to wood ducks, bluebirds, wrens, and dogs.

Referring to FIG. 5A, the present embodiment comprises a galvanized metal mounting bracket 101L. Once the double box assembly described above is assembled, mounting bracket 101L is fastened to the top of a wooden post using screws or to the metal flange on top of a metal post using bolt, washer and nut assemblies. Box 101 then receives four bolts with fender washers through screw holes 101F in the floor of box 101. The bolts are then secured in place with four flat push-nuts on the outside of the floor of box 101, and the bolts are lined up with four predrilled holes in mounting bracket 101L and dropped into place. The four bolts then receive washer and nut assemblies to finish the mounting. Those skilled in the art, in light of the present teachings, will readily recognize that a multiplicity of suitable fastening means and methods exist to attach box 101 to post 108.

Referring to FIG. 5A, the front of the present embodiment is identical to the embodiment illustrated by way of example in FIGS. 1A through 2C. In the present embodiment an upper faceplate piece 104 comprises a rain guard 104A, an entrance hole 104B and a shiplap 104C, and a lower faceplate piece 106 comprises a landing ledge 106A and fits under shiplap 104C of upper faceplate piece 104. Element number 106B illustrates the composite wooden perch that gets fastened to the landing ledge. This perch allows resident birds to either land or perch more easily on the nest box. Upper faceplate piece 104 and lower faceplate piece 106 are attached to flange 101A of box 101 with bolts, however, in the present embodiment, the bolts do not go through any material other than faceplate pieces 104 and 106 and flange 101A on box 101. Washer and nut assemblies on the back of flange 101A complete the installation of faceplate pieces 104 and 106. Alternate embodiments may comprise a faceplate that is a single piece rather than two separate pieces.

In the present embodiment, a transparent viewing window 101H on the back of box 101 enables a user to look into box 101 and liner 103 to determine when a cleaning is needed. Viewing window 101H can be covered by a viewing window cover 101I when not in use to generally prevent light from entering box 101 and liner 103 through viewing window 101H. In the present embodiment, viewing window cover 101I is constructed of rubber and attaches to box 101 with fasteners such as, but not limited to, screws or bolts. Alternate embodiments may comprise no viewing window cover or viewing window covers with varying designs. For example, without limitation, in one alternate embodiment, the viewing window cover may be attached to the box with a hinge above the viewing window that enables a user to life the viewing window cover to look into the box without removing the viewing window cover. When a user determines that box 101 and liner 103 require cleaning, the user removes the bolts holding upper faceplate 104 and lower faceplate 106 in place and then cleans box 101 and liner 103 through the open front.

Utilizing the above-mentioned design elements, the preferred embodiments of barn owl boxes solve a number of problems presented by the traditional use of wood, and also solve a number of problems presented by the novel use of plastic. For example, without limitation, the barn-mounted embodiment offers farmers, conservationists, and others an easily installed, lightweight nest box to attract barn owls to their properties. This embodiment also solves the problem of impregnability of metal barns by providing a method to attach the box without compromising the integrity of the barn. Furthermore, the post mounted embodiment solves the problem of overheating inherent to plastic by combining a number of heat-resistant materials and venting methods, creating a nest box that can be mounted in full sun without overheating, and that also will not succumb to the weathering and rotting associated with wood. It is contemplated that barn owl boxes according to embodiments of the present invention will provide long-lasting nest boxes that will save costs over using wood, may attract more people to erecting nest boxes, help increase the use of IPM, which could benefit the environment in general, and help conserve a valuable species.

Having fully described at least one embodiment of the present invention, other equivalent or alternative methods of providing barn owl boxes according to the present invention will be apparent to those skilled in the art. The invention has been described above by way of illustration, and the specific embodiments disclosed are not intended to limit the invention to the particular forms disclosed. For example, the particular implementation of the nest box may vary depending upon the particular type of species being housed within the box. The boxes described in the foregoing were directed to barn owl implementations; however, similar techniques are to provide nest boxes for other species of birds such as, but not limited to, bluebirds, screech owls, and wood ducks, all of whom use manmade nest boxes. Non-barn owl implementations of the present invention are contemplated as within the scope of the present invention. The invention is thus to cover all modifications, equivalents, and alternatives falling within the spirit and scope of the foregoing disclosure.

What is claimed is:

1. An apparatus for a nest box, the apparatus comprising:
   a. an outer box for establishing a nesting enclosure, said outer box being molded from a plastic material wherein said plastic material is impregnated with a heat-reflective pigment and comprising a generally rectangular shape with an open end, a closed end, sides, a top and a bottom, said sides comprising a plurality of vent holes positioned in upper portions, said bottom comprising a plurality of drain holes, said top comprising vent slots and vent covers;
   b. an inner liner comprising a generally rectangular shape for, containment within said outer box with an air space between said inner liner and said outer box, said inner liner further comprising an open end, a closed end, sides a top and a bottom, said sides of said inner liner comprising a plurality of vent holes positioned in lower portions, said top of said inner liner comprising a plurality of vent holes, and said bottom of said inner liner comprising a plurality of drain holes; and
   c. a faceplate for covering said open end, of said outer box said faceplate comprising an opening for providing access to said outer box.

2. The apparatus as recited in claim 1, further comprising a bracket for joining the apparatus to a structure.

3. The apparatus as recited in claim 1, wherein said heat-reflective pigment comprises titanium dioxide.

4. The apparatus as recited in claim 1, wherein said faceplate further comprises a rain-guard positioned above said opening and a landing edge below said opening.

5. The apparatus as recited in claim 2, wherein the structure is an exterior wall of a building having an opening for accessing said outer box.

* * * * *